US007756779B1

(12) United States Patent
de Toledo et al.

(10) Patent No.: US 7,756,779 B1
(45) Date of Patent: Jul. 13, 2010

(54) SYSTEM AND METHOD FOR DETERMINING COMPLIANCE WITH A DELEGATED UNDERWRITING AND SERVICING AGREEMENT

(75) Inventors: Luiz de Toledo, Bethesda, MD (US); Michael J. Dunmyer, Arlington, VA (US); Gordon W. Crawford, Chantilly, VA (US); Ashish Gupta, Bethesda, MD (US)

(73) Assignee: Fannie Mae, Washington, DC (US)

( * ) Notice: Subject to any disclaimer, the term of this patent is extended or adjusted under 35 U.S.C. 154(b) by 1075 days.

(21) Appl. No.: 11/058,408

(22) Filed: Feb. 14, 2005

Related U.S. Application Data (60) Provisional application No. 60/544,397, filed on Feb. 13, 2004.

(51) Int. Cl.
*G06Q 40/00* (2006.01)
(52) U.S. Cl. ....................................................... 705/38
(58) Field of Classification Search .................. 705/38, 705/35
See application file for complete search history.

(56) References Cited

U.S. PATENT DOCUMENTS

| 5,262,941 | A |   | 11/1993 | Saladin et al. |       |
|-----------|---|---|---------|----------------|-------|
| 5,563,783 | A |   | 10/1996 | Stolfo et al.  |       |
| 5,870,721 | A |   | 2/1999  | Norris         |       |
| 5,930,775 | A |   | 7/1999  | McCauley et al.|       |
| 5,940,812 | A |   | 8/1999  | Tengel et al.  |       |
| 5,966,700 | A | * | 10/1999 | Gould et al.   | 705/38|
| 5,983,206 | A |   | 11/1999 | Oppenheimer    |       |
| 6,014,645 | A |   | 1/2000  | Cunningham     |       |
| 6,070,151 | A |   | 5/2000  | Frankel        |       |
| 6,088,686 | A |   | 7/2000  | Walker et al.  |       |

(Continued)

FOREIGN PATENT DOCUMENTS

| WO | WO 0116845 A1 | 3/2001 |
| WO | WO 0163445 A2 | 8/2001 |
| WO | WO 0163534 A2 | 8/2001 |
| WO | WO 0223443 A1 | 3/2002 |

OTHER PUBLICATIONS

Sorohan, Mike. "Lender concerns target OFHEO's counterparty risk language". Real Estate Finance Today. Washington: Sep. 10, 2001. vol. 18, Iss. 34. (3 pages from Proquest).*

(Continued)

*Primary Examiner*—Kambiz Abdi
*Assistant Examiner*—Jennifer Liversedge
(74) *Attorney, Agent, or Firm*—Foley & Lardner LLP (57) ABSTRACT

A method for determining compliance with a delegated underwriting and servicing agreement between a mortgage seller and a mortgage purchaser relating to the sale of multi-family mortgage loans using a computer network includes receiving mortgage data regarding at least one multifamily mortgage loan in a mortgage portfolio of the mortgage seller and financial data regarding the mortgage portfolio and receiving mortgage seller data. The delegated underwriting and servicing agreement includes a loss sharing provision, a servicing provision allowing the mortgage seller to retain servicing rights for the multifamily mortgage loans and a provision that the mortgage seller be adequately capitalized against the risk for each multifamily mortgage loan. The method also includes storing the mortgage data, financial data and mortgage seller data and applying a set of predefined capital standards to the mortgage data, financial data and mortgage seller data to determine compliance with the delegated underwriting and servicing agreement.

31 Claims, 4 Drawing Sheets

U.S. PATENT DOCUMENTS

| | | | |
|---|---|---|---|
| 6,112,190 | A | 8/2000 | Fletcher et al. |
| 6,119,103 | A | 9/2000 | Basch et al. |
| 6,202,053 | B1 | 3/2001 | Christiansen et al. |
| 6,438,526 | B1 | 8/2002 | Dykes et al. |
| 6,594,635 | B1 | 7/2003 | Erlanger |
| 7,146,337 | B1 | 12/2006 | Ward et al. |
| 7,340,424 | B2 * | 3/2008 | Gang et al. ............. 1/1 |
| 2001/0037287 | A1 | 11/2001 | Broadbent et al. |
| 2002/0029194 | A1 | 3/2002 | Lewis et al. |
| 2002/0059137 | A1 | 5/2002 | Freeman et al. |
| 2003/0033242 | A1 | 2/2003 | Lynch et al. |
| 2003/0093366 | A1 | 5/2003 | Halper et al. |
| 2003/0229581 | A1 | 12/2003 | Green et al. |
| 2004/0064402 | A1 | 4/2004 | Dreyer et al. |
| 2004/0215553 | A1 | 10/2004 | Gang et al. |
| 2004/0215555 | A1 | 10/2004 | Kemper et al. |

OTHER PUBLICATIONS

Tribble, Tom, Litter, Mary Ellen. "Monitoring commerical portfolios". Mortgage Banking. Washington: Apr. 1992. vol. 52, Iss. 7. (8 pages from ProQuest).*

Fannie Mae. "New DUS lender capital standards and requirements". Pre-Jan. 2004. (12 pages from Google).*

Bank Capital Markets Consulting, pp. 1-9, Arlington, VA, USA.

Fannie Mae, Guide to Underwriting with Desktop Underwriter, Oct. 1997, 152 pages, Verison 4.0, Fannie Mae, Washington, DC, USA.

Federal Register, Department of the Treasury, Risk-Based Capital Guidelines, Capital Adequacy Guidelines, Capital Maintenance: Capital Treatment of Recourse, Direct Credit Substitutes and Residual Interests in Asset Securitizations, Final Rules, Nov. 29, 2001, vol. 66, No. 230, 55 pages.

LEXSEE 59 fr 27116, Federal Register, Proposed Rules, Risk-Based Capital Requirements-Recourse and Direct Credit Substitutes, Part II, May 25, 1994, vol. 59, No. 100, pp. 1-40.

* cited by examiner

SYSTEM AND METHOD FOR DETERMINING COMPLIANCE WITH A DELEGATED UNDERWRITING AND SERVICING AGREEMENT

PRIORITY

This application is a an application claiming the benefit under 35 USC 119(e) of U.S. Provisional Patent Application 60/544,397, filed Feb. 13, 2004, titled "System and Method For Increasing Ownership Of Multifamily Properties," incorporated herein by reference in its entirety.

FIELD OF THE INVENTION

The present invention relates generally to the field of computer systems and methods for processing mortgage loan data and in particular to a system and method for determining compliance with a delegated underwriting and servicing agreement.

BACKGROUND OF THE INVENTION

Multifamily housing is housing that is subdivided into a number of independent units (e.g., five or more independent units). Each unit is configured to house a person or group of people, hereinafter referred to as residents. The number of units in a multifamily housing property can vary from a relatively small number of units, such as in a building including five units, to a relatively large number of units, such as in an apartment building having hundreds of units.

Because of the amount of money involved in purchasing multifamily property, most potential purchasers do not purchase the multifamily housing property outright on a cash basis. Rather, lenders, such as banks, mortgage lenders, credit unions, and so on, offer multifamily mortgage loans to potential multifamily property purchasers. The mortgage allows the borrower to purchase the multifamily property and pay for the multifamily property over time, while also ensuring that the lender is repaid.

Lenders often sell the mortgages to a mortgage purchaser to obtain additional funding for further loans. Accordingly, the lender becomes a mortgage seller and sells the loan to a mortgage purchaser or participant in the secondary mortgage market.

A multifamily mortgage may be subdivided into multiple rights. For example, a note holder of a multifamily mortgage typically has the right to collect principal and interest payments whereas a servicer has a right to receive a portion of the interest payment to compensate the servicer for performing servicing in connection with the loan. Any right of the multifamily mortgage product may be further subdivided, e.g., into different cash flows. For example, an interest payment may include a servicing fee allocated to pay fees associated with the servicing of the loan.

Often, the mortgage seller may sell the multifamily mortgage loan to the mortgage purchaser, but retain some of the rights for the mortgage loan. For example, the mortgage seller may sell the multifamily mortgage loan but retain the servicing rights for the loan. Accordingly, the mortgage seller retains both an obligation, that of servicing the loan, and a benefit, entitlement to the servicing fees.

The mortgage purchaser may enter an agreement in advance to purchase a multifamily mortgage from the mortgage seller provided it meets pre-defined requirements. The agreement may also stipulate that the mortgage seller will be responsible for the approval, processing, and servicing of the loan. Such an agreement may be referred to as a delegated underwriting and servicing commitment.

A delegated underwriting and servicing commitment often includes a requirement that the mortgage seller will retain a portion of the risk of loss for the mortgage to be sold. For example, the seller retains a portion of the risk that a borrower defaults on the mortgage. The allocation of risk may be defined in a loss sharing provision (e.g., text, schedule, etc.) in the delegated underwriting and servicing commitment.

In order to enter a delegated underwriting and servicing commitment with a mortgage purchaser, a mortgage seller must meet predefined eligibility requirements of the mortgage purchaser. In addition, the mortgage purchaser may require the mortgage seller to comply with predefined requirements (e.g., a set of capital standards) on an ongoing basis during the term of the delegated underwriting and servicing commitment in order to maintain eligibility. The delegated underwriting and servicing commitment may require the mortgage seller and/or the mortgage purchaser to determine compliance based on the predefined requirements on a periodic basis.

It would be advantageous to provide a system and method for determining compliance with a delegated underwriting and servicing agreement. In addition, it would be advantageous to provide a system and method for determining compliance based on a predefined set of capital standards including a set of risk-based liquidity requirements.

SUMMARY OF THE INVENTION

In accordance with one embodiment, a system for determining compliance with a delegated underwriting and servicing agreement between a mortgage seller and a mortgage purchaser relating to the sale of multifamily mortgage loans, the delegated underwriting and servicing agreement including a loss sharing provision, a servicing provision allowing the mortgage seller to retain servicing rights for the multifamily mortgage loans and a provision that the mortgage seller be adequately capitalized against the risk for each multifamily mortgage loan, includes data capture logic configured to received mortgage data regarding at least one multifamily mortgage loan in a mortgage portfolio of the mortgage seller associated with the delegated underwriting and servicing agreement and financial data regarding the mortgage portfolio, a user interface configured to receive a request to determine compliance of the mortgage seller and to receive mortgage seller data regarding the mortgage seller, at least one database coupled to the data capture logic and user interface, the at least one database configured to store the mortgage data, financial data and mortgage seller data, and compliance logic coupled to the user interface and the at least one database, the compliance logic configured to apply a set of predefined capital standards to the mortgage data, financial data and mortgage seller data to determine compliance with the delegated underwriting and servicing agreement, the set of predefined capital standards including at least 1) a set of requirements regarding appropriate business activities of the mortgage seller, 2) a net worth requirement including a minimum net worth for the mortgage seller and a valuation of the servicing rights, 3) a set of risk-based liquidity requirements used to determine if the mortgage seller can meet obligations of the loss sharing provision and including a determination of risks for at least one multifamily loan in the mortgage portfolio and 4) a set of requirements regarding the encumbrance of the servicing rights, the compliance logic further configured to generate a compliance determination based on the application of the predefined risk-based capital standards.

In accordance with another embodiment, a method for determining compliance with a delegated underwriting and servicing agreement between a mortgage seller and a mortgage purchaser relating to the sale of multifamily mortgage loans using a computer network, the delegated underwriting and servicing agreement including a loss sharing provision, a servicing provision allowing the mortgage seller to retain servicing rights for the multifamily mortgage loans and a provision that the mortgage seller be adequately capitalized against the risk for each multifamily mortgage loan, includes receiving mortgage data regarding at least one multifamily mortgage loan in a mortgage portfolio of the mortgage seller associated with the delegated underwriting and servicing agreement and financial data regarding the mortgage portfolio, receiving mortgage seller data regarding the mortgage seller, storing the mortgage data, financial data and mortgage seller data, applying a set of predefined capital standards to the mortgage data, financial data and mortgage seller data to determine compliance with the delegated underwriting and servicing agreement, the set of predefined capital standards including at least 1) a set of requirements regarding appropriate business activities of the mortgage seller, 2) a net worth requirement including a minimum net worth for the mortgage seller and a valuation of the servicing rights, 3) a set of risk-based liquidity requirements used to determine if the mortgage seller can meet obligations of the loss sharing provision and including a determination of risks for at least one multifamily loan in the mortgage portfolio and 4) a set of requirements regarding the encumbrance of the servicing rights, and generating a compliance determination based on the application of the predefined capital standards

DETAILED DESCRIPTION OF THE PREFERRED EMBODIMENTS

Figure 1A:
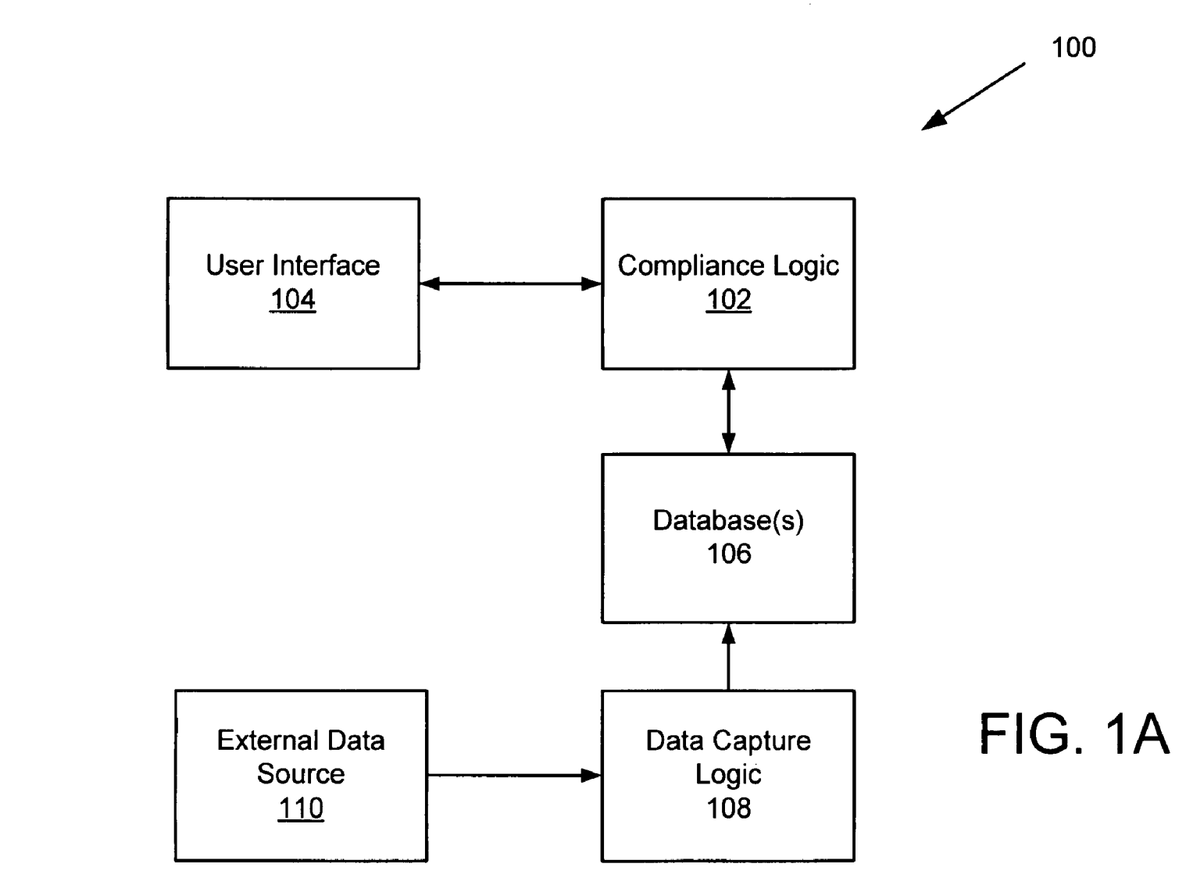
FIGS. 1A and 1B are a block diagram of a system for determining compliance with a delegated underwriting and servicing agreement in accordance with an embodiment.

FIG. 1A is a block diagram of a system 100 for determining compliance with a delegated underwriting and servicing agreement in accordance with an embodiment. A delegated underwriting and servicing agreement (or commitment) is an agreement between a mortgage seller and a mortgage purchaser regarding the sale of mortgage loans from the seller to the purchaser and the delegation of responsibilities related to a mortgage loan from the purchaser to the seller such as origination, underwriting, servicing and delivering the mortgage loan. A mortgage seller may be, for example, a mortgage lender, a bank, a mortgage lender, a credit union and/or other financial institution. The mortgage purchaser is a participant in the secondary mortgage market. Herein, for convenience, the participant is referred to as a "purchaser," although it should be understood that the purchaser may participate in the secondary market in other, different or additional ways (e.g., as a loan guarantor, a loan securitizer and so on).

The delegated underwriting and servicing agreement (or commitment) may be an agreement to purchase a single multifamily mortgage loan from the mortgage seller or, alternatively, an agreement to purchase multiple multifamily mortgage loans. The delegated underwriting and servicing agreement may be related to existing loans or loans that are to be made in the future. As mentioned, a delegated underwriting and servicing agreement may include a delegation of responsibilities related to a mortgage loan from the mortgage purchaser to the mortgage seller such as origination, underwriting, servicing and delivery of mortgage loans. In one embodiment, the delegated underwriting and servicing agreement specifies that the underwriting standards used to underwrite multifamily mortgage loans are defined by the mortgage seller. In another embodiment, the delegated underwriting and servicing agreement specifies that the underwriting standards used to underwrite multifamily mortgage loans are defined by the mortgage purchaser. The delegation may further specify that the delegation is made such that the responsibilities are performed without loan approvals and processing by the mortgage purchaser. In another embodiment, a delegated underwriting and servicing agreement may be a master commitment that is not related to any specific mortgage loan or loans. A master commitment is an agreement between the mortgage seller and the mortgage purchaser that describes terms applicable to future sales of multifamily mortgage products under the master commitment. Future commitments for the sale of multifamily mortgage products under the master commitment incorporate the terms of the master commitment. Accordingly, a delegated underwriting and servicing agreement (or commitment) need not be tied to any specific multifamily mortgage loan or loans.

The delegated underwriting and servicing agreement includes a purchase obligation by the mortgage purchaser to the mortgage seller to purchase multifamily mortgage loans according to the terms defined in the delegated underwriting and servicing agreement. The purchase obligation may be an obligation to pay a specific amount for a specific mortgage, an amount based on a market rate, a percentage based on an unpaid principal balance for the mortgage loan, etc. The purchase obligation may be an obligation to purchase a single mortgage loan, multiple mortgage loans, etc. The purchase obligation may also be an obligation to purchase less than all of the rights associated with a multifamily mortgage. For example, a mortgage purchaser may desire to have the mortgage seller retain servicing rights for the multifamily mortgage loan. Accordingly, the mortgage seller may retain an obligation to provide servicing for the loan and also an entitlement to servicing fees in payment for servicing the loan.

The delegated underwriting and servicing agreement also includes a selling obligation by the mortgage seller to sell a multifamily mortgage to the mortgage purchaser for an amount defined by the purchase obligation. The obligation to sell a mortgage loan may be an obligation to sell only some of the rights associated with the multifamily mortgage loan. For example, the mortgage seller may retain servicing rights for the multifamily mortgage.

The delegated underwriting and servicing agreement also includes a loss sharing provision defining the allocation of the risk of loss on the multifamily mortgage loan (or loans) between the mortgage seller and the mortgage purchaser. The loss sharing provision may be implemented in the text of the delegated underwriting and servicing agreement, in an attached schedule, etc. The loss sharing provision may allocate the risk of loss between the mortgage seller and the mortgage purchaser on a pro rata basis, by defining a cap on losses for either the mortgage seller or mortgage purchaser, or other manner of loss sharing. The delegated underwriting and servicing agreement may also include terms defining when mortgage loans are to be sold, a commitment amount describing the total amount of mortgage loans that are to be sold, etc.

Once a mortgage seller has entered into a delegated underwriting and servicing agreement with the mortgage purchaser, the mortgage seller must meet capital standards and requirements of the mortgage purchaser to ensure that the mortgage seller is able to meet its loss sharing obligations under the delegated underwriting and servicing agreement. The mortgage seller should maintain compliance with the capital standards and requirements during the term of the delegated underwriting and servicing agreement. System 100 shown in FIG. 1A may be used to determine compliance with predetermined capital standards (or requirements) of the mortgage purchaser. Compliance may be determined on a periodic basis during the term of the delegated underwriting and servicing agreement. For example, compliance may be determined monthly, quarterly, etc. System 100 includes a user interface 104, compliance logic 102, database(s) 106 and data capture logic 108. User interface 104 may be used to access compliance logic 102 in order to request and receive a compliance determination related to a particular mortgage seller and delegated underwriting and servicing agreement. User interface 104 includes conventional input and display devices (not shown). Preferably, a user accesses compliance logic 102 over a network such as the Internet, an Intranet or other computer network using a personal or laptop computer or other suitable network enabled devices. For example, compliance logic 102 may be accessible to user by utilizing user interface 104 to access a web site and clicking on appropriate links located at the web site. Accordingly, user interface 104 may be configured to display different web pages of a web site relating to compliance logic 102. Various embodiments may be implemented in a variety of environments including a single computer system, intranets, local area networks, communication networks, dial-up services, etc.

Figure 1B:
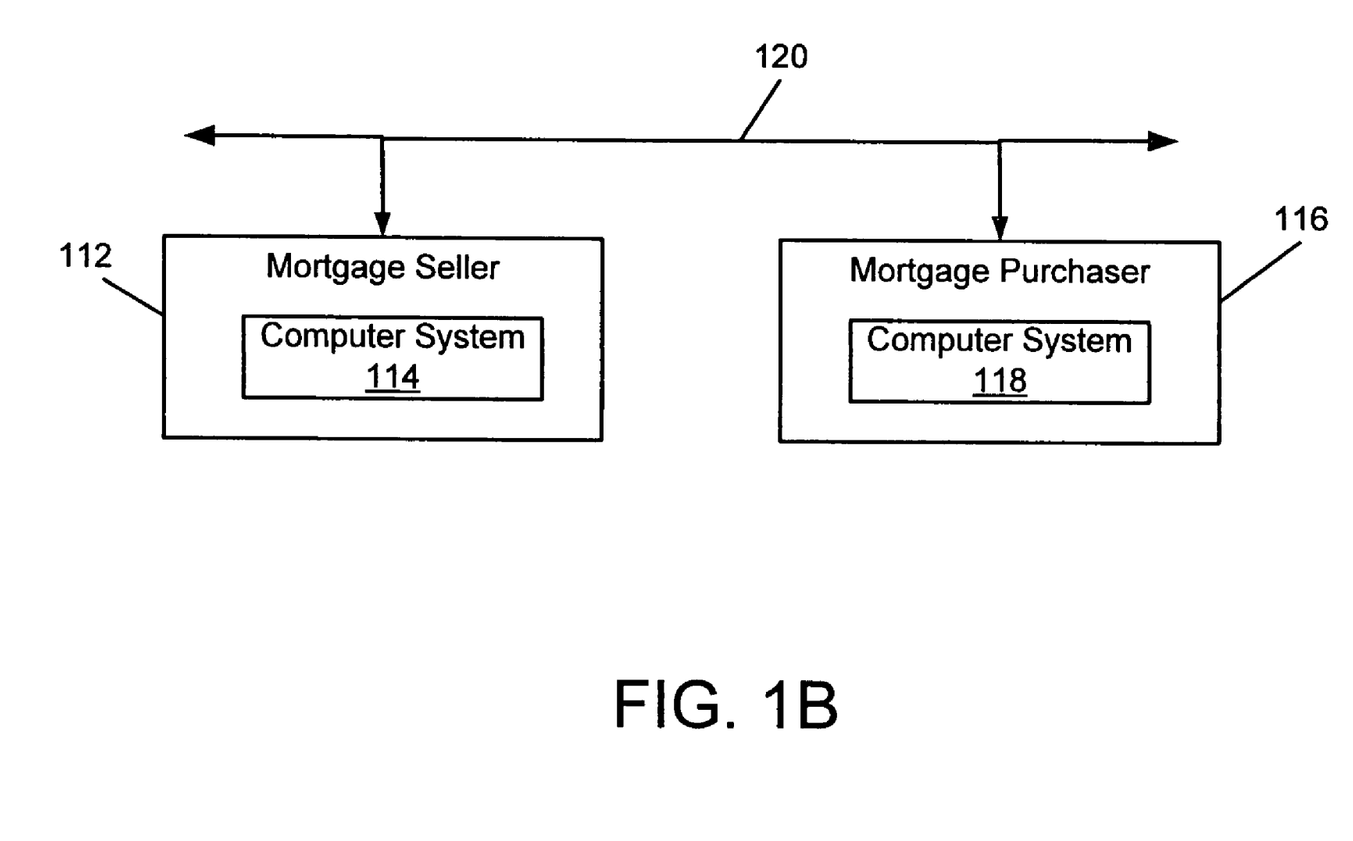

Elements of system 100 may be implemented on a computer system utilizing existing computer capabilities, both hardware and software, and electronic communications links and may include computer servers. The computer systems or servers may operate under the control of computer software to carry out the process steps described herein. The various elements of system 100 may be implemented on a single computer system or multiple computer systems. FIG. 1B is a block diagram of a computer system 114 associated with a mortgage seller 112 and a computer system 118 associated with a mortgage purchaser 116 that may be used to implement the various features of system 100 described herein. Each computer system 114 and 118 may comprise a single computer including a microprocessor and memory with program logic and stored data to implement the features described herein, or may comprise multiple computers which are connected together, for example, by way of an internal network (not shown). System 100 may be implemented entirely on mortgage seller computer system 114 or entirely on mortgage purchaser computer system 118. Alternatively, various elements of system 100 may be implemented on computer system 114 and various elements of system 100 implemented on computer system 118. For example, user interface 104 (shown in FIG. 1A) may be implemented on mortgage seller computer system 114 and compliance logic 102, database(s) 106 and data capture logic 108 (shown in FIG. 1A) may be implemented on mortgage purchaser computer system 118. Accordingly, computer system 114 and computer system 118 may be coupled by a network 120, which is shown to be a single network but which may in practice comprise one or more individual point-to-point connections and/or which may comprise one or more network connections, such as the Internet.

Returning to FIG. 1A, compliance logic 102 is configured to determine compliance with a delegated underwriting and servicing agreement and to generate a compliance determination that may be provided to a user via, for example, user interface 104. The compliance determination may include, for example, an indication of compliance or non-compliance, results of various risk calculations, additional requirements for a non-compliant mortgage seller, etc. Compliance logic 102 is coupled to a database 106 that is configured to store data regarding at least one mortgage seller and at least one mortgage loan associated with the mortgage seller. In one embodiment, a database 106 may be provided for each of a plurality of mortgage sellers with which the mortgage purchaser has a delegated underwriting and servicing agreement. Database 106 may also be coupled to data capture logic 108 that is configured to receive information to be used in determining compliance. For example, a mortgage seller may upload information from a mortgage seller computer system via data capture logic 108 or alternatively, data may be provided from an external data source 110.

Information and data regarding the mortgage seller may include financial information (e.g., quarterly financial information, annual financial information, balance sheets, QTD and YTD P&I (principal and insurance), QTD and YTD cash flows, audited financial statements), non-financial information, etc. Information and data regarding mortgage loan or loans associated with the delegated underwriting and servicing agreement (e.g., loans originated, underwritten and sold in accordance with the delegated underwriting and servicing agreement) may include performance data regarding a specific mortgage loan or portfolio of loans, mortgage loan portfolio information such as geographic data, borrower data, valuation methodology, composition by investor and product type, internal modified loss sharing policies, unpaid balances, etc. A mortgage seller may provide such information on a periodic basis, e.g., monthly, quarterly, etc.

Figure 2:
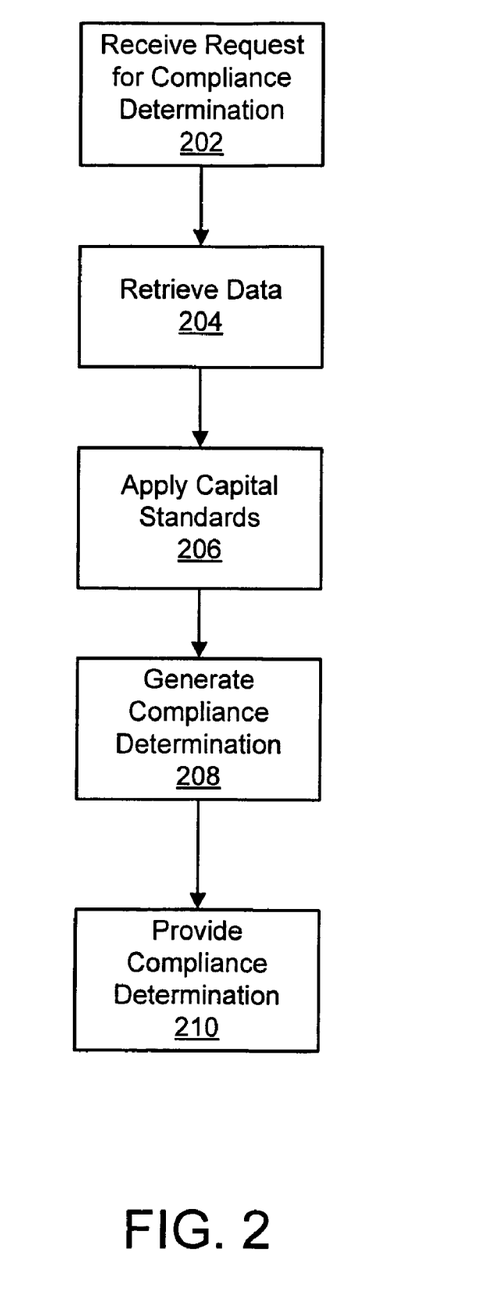
FIG. 2 illustrates a method for determining compliance with a delegated underwriting and servicing agreement in accordance with an embodiment.

Upon receiving a request from a user (e.g., a user associated with the mortgage seller or a user associated with the mortgage purchaser), compliance logic 102 determines compliance with the delegated underwriting and servicing agreement using data from database 106 and data provided via user interface 104. FIG. 2 illustrates a method for determining compliance with a delegated underwriting and servicing agreement in accordance with an embodiment. At block 202, a request is received from a user to obtain a compliance determination for a particular mortgage seller. At block 204, relevant data and information for the compliance determination is retrieved from a database. Compliance logic 102 (shown in FIG. 1A) then applies a set of predetermined capital standards (or requirements) to the retrieved data at block 206. The set of predetermined capital standards are configured to determine if the mortgage seller possess the risk-based capital needed to meet the loss sharing obligation of the delegated underwriting and servicing agreement. In one embodiment, the set of capital standards includes four requirements, namely, 1) the mortgage seller must be an ongoing delegated underwriting and servicing entity; 2) a net worth requirement; 3) a risk-based liquidity requirement; and 4) unencumbered servicing portfolio and unencumbered stock, partnership and ownership rights of the mortgage seller.

Figure 3:
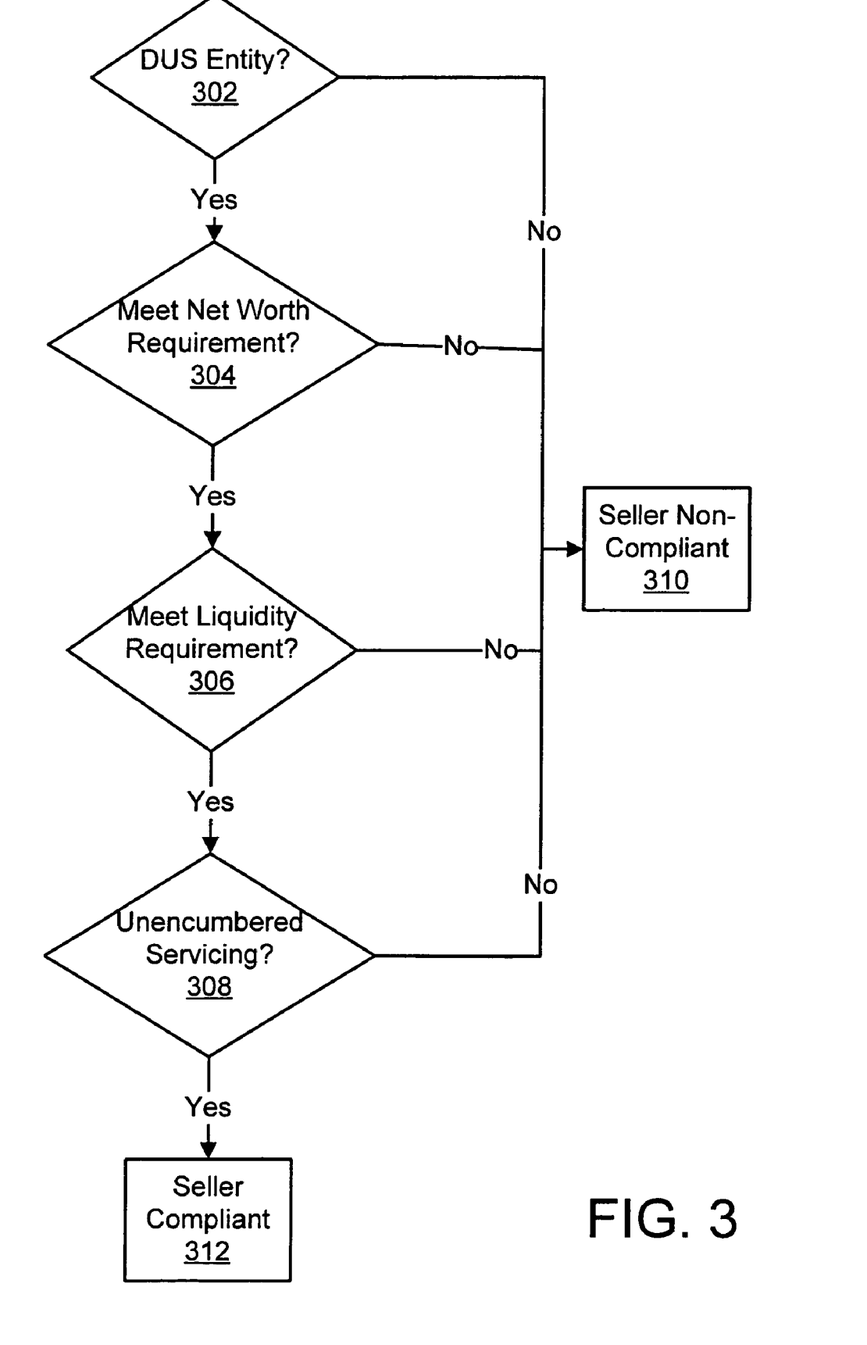
FIG. 3 illustrates a method for applying a set of capital standards in accordance with an embodiment.

FIG. 3 illustrates a method for applying a set of capital standards in accordance with an embodiment. At block 302, it is determined whether the mortgage seller is an ongoing delegated underwriting and servicing entity. As used herein, a delegated underwriting and servicing entity is a legal entity whose business is limited to delegated underwriting and servicing transactions, non-recourse transactions, non-recourse origination, selling and servicing and other businesses approved by the mortgage purchaser. In one embodiment, a credit rating of the mortgage seller (or a parent company of the mortgage seller) may be used to determine whether the mortgage seller may engage in other businesses. For example, a mortgage seller that is an institution rated investment grade or a mortgage seller that is owned by an institution that is rated investment grade and is providing unconditional parental guarantees may be allowed by the mortgage purchaser to engage in other businesses. If the mortgage seller is not an ongoing delegated underwriting and servicing entity, the mortgage seller is non-compliant and the mortgage purchaser may be entitled to take certain actions in accordance with the delegated underwriting and servicing agreement at block 310. If the mortgage seller is an ongoing delegated underwriting and servicing entity, the process moves to block 304.

At block 304, it is determined whether the mortgage seller meets a predetermined net worth requirement configured to assess the financial viability of the mortgage seller. The mortgage purchaser establishes a predetermined amount (e.g., a dollar amount or percentage) of the mortgage sellers net worth that should be maintained in the mortgage seller entity and on deposit in a trustee. In one embodiment, the net worth of the mortgage seller includes a value of the mortgage loan servicing portfolio of the mortgage seller as well as other predefined assets. An exemplary servicing value calculation is the greater of 1) 7.5 million or 2) 2.5 million plus 1.00% of the first 500 million delegated underwriting and servicing unpaid balance plus 0.75% of the next 500 million delegated underwriting and servicing unpaid balance plus 0.50% of the unpaid balance over 1 billion delegated underwriting and servicing unpaid balance plus 0.20% of non-delegated underwriting and servicing unpaid balance of the mortgage purchaser. In an exemplary embodiment, the allowable assets of the mortgage seller include a net worth calculated using GAAP (Generally Accepted Accounting Principles) plus any on balance sheet general reserves for delegated underwriting and servicing loan losses. These allowable assets may also be adjusted by subtracting 1) the portion of the stated value of any off balance sheet LOC's, guarantees or similar financial instruments used in lieu of on balance sheet assets to meet the liquidity requirements that is not collateralized by cash and/or securities reflected as restricted assets on the delegated underwriting and servicing seller's balance sheets; 2) notes due from affiliates or other affiliate receivables; 3) goodwill or other intangible assets; 4) any other assets determined by the mortgage purchaser to be of questionable value. In one embodiment, if the mortgage seller has an unconditional guarantee of a parent entity rated investment grade, the mortgage seller may receive a reduction in the net worth requirement (e.g., the amount of the mortgage seller's net worth that must be maintained in the mortgage seller and on deposit with a trustee). If the mortgage seller does not meet the net worth requirement, the mortgage seller is non-compliant and the mortgage purchaser may be entitled to take certain actions in accordance with the delegated underwriting and servicing agreement at block 310. If the mortgage seller meets the net worth requirement, the process moves to block 306.

At block 306, it is determined whether the mortgage seller meets a risk-based liquidity requirement configured to ensure the mortgage seller is able to meet its financial obligations as part of the delegated underwriting and servicing agreement loss sharing provision. Under the risk-based liquidity requirement, the risk assumed by the mortgage seller varies based on a plurality of variables such as credit quality (e.g., debt service coverage ratio (DSCR), loan to value (LTV)), mortgage seller loss sharing percent, term structure, other risk variables such as mark-to-market and concentrations of loans in the mortgage seller's portfolio. In one embodiment, a liquidity requirement is determined for each loan in the mortgage seller's portfolio based on origination DSCR and LTV as reflected in the loan's pricing tier and the percentage of loss sharing assumed by the mortgage seller. In an exemplary embodiment, the Office of Federal Housing Enterprise Oversight (OFHEO) model incidence and severity parameters may be used to define each mortgage loan pricing tier's liquidity requirement. Preferably, the liquidity requirement (i.e., the amount of capital the mortgage seller is required to fund and maintain to meet their loss sharing obligations under the delegated underwriting and servicing agreement) for each loan is divided among three liquidity accounts: 1) an operational liquidity account; 2) a restricted liquidity account; and 3) an unrestricted liquidity account. The calculated liquidity requirement may be defined, for example, as a variable component expressed as basis points or as a fixed amount plus a variable component expressed as basis points. The variable component may vary based on, for example, the particular pricing tier for a mortgage loan, marked to market tier or geographic concentration.

The liquidity requirement may also define the allowable assets that may be used to fund each type of liquidity account. For example, operational liquidity and restricted liquidity accounts may be funded using 1) cash and LOC from an entity with a credit rating of A or better; 2) government obligations under 5 years; 3) short-term interest bearing debt from a secondary mortgage market participant, FHLB's or the FED Farm Credit Bank; 4) commercial paper issued by company's rated A or better; 5) overnight or term Fed Funds sold to, or CD's of, federally insured depositories rated C or better and 6) with written consent of the mortgage purchaser, investment agreements between the mortgage purchaser and custodian. In another embodiment, allowable assets for an operational liquidity account include equity in excess of the minimum requirements of the warehouse line provider, principal and interest (P&I) advances is recoverable and restricted liquidity held at a trustee in excess of the restricted liquidity requirement. Allowable assets for an unrestricted liquidity account may include, for example, allowable assets for a restricted liquidity account, marketable securities, insurance policies or contingent capital facilities from approved third parties rated A or better, equity in excess of the minimum requirements of the warehouse line provider, P&I advances if recoverable, restricted liquidity held at a bank in excess of the restricted liquidity requirement and with approval of the mortgage purchaser, LOC's or guarantees from approved third parties collateralized by FHA servicing, mortgage purchaser servicing, or other approved assets. The liquidity requirement may also include requirements as to the portion of the liquidity amount that should be funded in each account and the timing of the funding. For example, a mortgage seller may fully fund the liquidity accounts over a predetermined time period (e.g., a portion of the liquidity amount may be provided upon sale to the mortgage purchaser and a remainder in predefined installments monthly for a period of months).

In another embodiment, the liquidity requirement may also be determined based on an assessment of portfolio risk due to mark-to-market changes in credit quality and concentrations of particular types of mortgage loans in a portfolio (e.g., geographic and large loans). In this embodiment, a new mark-to-market tier is assigned to each loan in a portfolio based on a DSCR calculation made using an annual reporting statement submission. The DSCR ratio is defined as the ratio of net operating income (NOI) from properties that are collateral for a loan to the P&I payments required on the loan. A mark-to-market DSCR may be calculated as the sum of net operating incomes from the most recent annual operating statement submission for all properties collateralizing a loan divided by the sum of P&I payments for all loans, including any supplemental debt on collateral properties. The calculated mark-tomarket DSCR is then used to assign a new mark-to-market tier to each loan. The restricted and unrestricted liquidity requirements may then be calculated based on the new mark-to-market tier.

In addition, geographic and loan size concentrations for a mortgage sellers mortgage loan portfolio (including both delegated underwriting and servicing and non-delegated underwriting and servicing loans) are measured and additional restricted and unrestricted liquidity may be required to offset increased risk in portfolios with extreme geographic or loan size concentrations. In one embodiment, the total adjustment to restricted and unrestricted liquidity may be capped. Portfolio concentrations may be measured in, for example, one MSA (Metropolitan Statistical Area), three MSA's and large loans. In an exemplary embodiment, the concentration tests may be based on all properties collateralizing delegated underwriting and servicing and non-delegated underwriting and servicing mortgage loans in the mortgage seller's portfolio. Geographic concentrations may be measured using data for Metropolitan Statistical Areas (MSA's) defined by the U.S. Office of Management and Budget. For example, geographic concentration may include a calculation of the percent of total portfolio unpaid balance collateralized by properties in the largest MSA and the largest three MSA's. The calculated concentration percent may then be used to identify an adjustment to the liquidity requirements. For example, a table may be provided that provides concentration percentages and an associated liquidity adjustment. The large loan concentration test may include a ranking of all properties in the portfolio by property level unpaid balance and comparison of the unpaid balance of a predetermined percentage of the largest properties in the portfolio by count to the total portfolio unpaid balance. A calculated concentration percent for large loans may then be used to identify an adjustment to the liquidity requirements. For example, a table may be provided that provides concentration percentages and an associated liquidity adjustment.

In one embodiment, the liquidity account requirements may be decreased based on the credit rating of the mortgage seller or the credit rating of a parent company of the mortgage seller. For example, the liquidity account requirements may be decreased for mortgage sellers that are either 1) institutions rated investment grade, or 2) subsidiaries of institutions rated investment grade for which the rated institution has provided a full and unconditional parental guarantee. If the mortgage seller does not meet the liquidity requirement, the mortgage seller is non-compliant and the mortgage purchaser may be entitled to take certain actions in accordance with the delegated underwriting and servicing agreement at block 310. If the mortgage seller meets the liquidity requirement, the process moves to block 308.

At block 308, it is determined whether the servicing rights retained by the mortgage seller are unencumbered as well as the mortgage seller's stock, partnership and ownership rights. Under this requirement, a mortgage seller may not pledge the servicing rights as well as the servicing income or a derivative of the servicing income to third parties. In one embodiment, the mortgage purchaser may provide permission to the mortgage seller to pledge servicing income. If the mortgage seller does not meet the requirement for unencumbered servicing, the mortgage seller is non-compliant and the mortgage purchaser may be entitled to take certain actions in accordance with the delegated underwriting and servicing agreement at block 310. If the mortgage seller meets the requirement for unencumbered servicing, the process moves to block 312.

If all of the capital standards requirements, as described above, are met by the mortgage seller, the mortgage seller is compliant with the standards and the delegated underwriting and servicing agreement at block 312. As mentioned above, if the mortgage seller is not compliant, the mortgage purchaser may be entitled to take certain actions in accordance with the delegated underwriting and servicing agreement at block 310. For example, the mortgage purchaser may be entitled to contractual remedies under the delegated underwriting and servicing agreement and the mortgage purchaser may require additional liquidity.

Returning to FIG. 2, based on the application of the capital standards, the compliance logic generates a compliance determination at block 208 and provides the compliance determination to the user at block 210. The compliance determination may include an indication of compliance or non-compliance, the calculations (e.g., risk calculations, etc.) made for the various requirements of the capital standards, additional requirements if the mortgage seller is not in compliance (e.g., additional liquidity), and so on.

The invention is described herein with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing it operations. The embodiments of the present invention may be implemented using an existing computer processor, or by a special purpose computer processor incorporated for this or another purpose or by a hard-wired system.

Embodiments within the scope of the present invention include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods described herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PC's, mini-computers, mainframe computers, and the like. Embodiments of the invention may also be practiced in distributed computing environments where tasks are performed by local and remote processing devices that are linked (either by hardwired links, wireless links or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention in various embodiments and with various modifications as are suited to the particular use contemplated.

What is claimed is:

1. A computer system configured to determine compliance with a delegated underwriting and servicing agreement between a mortgage seller and a mortgage purchaser relating to the sale of multifamily mortgage loans, the delegated underwriting and servicing agreement including a loss sharing provision, a servicing provision allowing the mortgage seller to retain servicing rights for the multifamily mortgage loans and a provision that the mortgage seller be adequately capitalized against risk for each multifamily mortgage loan, the system comprising:

machine readable media having programmed instructions stored therein;

a processor coupled to the machine readable media and operable to execute the programmed instructions, wherein the programmed instructions implement data capture logic configured to receive mortgage data regarding at least one multifamily mortgage loan in a mortgage portfolio of the mortgage seller associated with the delegated underwriting and servicing agreement and financial data regarding the mortgage portfolio;

a user interface, the user interface being configured to receive a request to determine compliance of the mortgage seller and to receive mortgage seller data regarding the mortgage seller;

at least one database, the at least one database being coupled to the data capture logic and user interface, the at least one database configured to store the mortgage data, financial data and mortgage seller data; and compliance logic coupled to the user interface and the at least one database, the compliance logic configured to apply a set of predefined capital standards to the mortgage data, financial data and mortgage seller data to determine compliance of the mortgage seller on an ongoing basis with the delegated underwriting and servicing agreement, during the term of the delegated underwriting and servicing agreement, the set of predefined capital standards including at least 1) a set of requirements regarding appropriate business activities of the mortgage seller, 2) a net worth requirement including a minimum net worth for the mortgage seller and a valuation of the servicing rights, 3) a set of risk-based liquidity requirements used to determine if the mortgage seller can meet obligations of the loss sharing provision and 4) a set of requirements regarding the encumbrance of the servicing rights, the compliance logic further configured to generate a compliance determination based on the application of the predefined capital standards; and wherein the set of risk-based liquidity requirements comprises a separate liquidity requirement for each of the multifamily loans in the mortgage portfolio that is determined based on risk characteristics of the respective loan, the risk characteristics including a debt service coverage ratio and loan-to-value ratio of the respective loan.

2. A system according to claim 1, wherein the appropriate business activities of the mortgage seller includes non-recourse business activities.

3. A system according to claim 1, wherein the appropriate business activities of the mortgage seller includes business activities approved by the mortgage purchaser.

4. A system according to claim 1, wherein the risk-based liquidity requirements include a requirement to maintain a plurality of liquidity accounts.

5. A system according to claim 4, wherein the plurality of liquidity accounts include an operational liquidity account, a restricted liquidity account and an unrestricted liquidity account.

6. A system according to claim 4, wherein the risk-based liquidity requirements include a predetermined amount of capital for each of the plurality of liquidity accounts.

7. A system according to claim 6, wherein the plurality of liquidity accounts are fully funded in a predetermined time period.

8. A system according to claim 6, wherein the mortgage seller data includes a credit rating for the mortgage seller and the predetermined amount of capital for each liquidity account is adjusted when the credit rating is a predetermined credit rating.

9. A system according to claim 6, wherein the mortgage seller data includes a credit rating for a parent company of the mortgage seller and the predetermined amount of capital for each liquidity account is adjusted when the credit rating is a predetermined credit rating.

10. A system according to claim 1, wherein the set of risk-based liquidity requirements includes a measurement of mark-to-market portfolio risks and multifamily loan concentration risks.

11. A system according to claim 1, wherein the mortgage seller data includes financial data related to the mortgage seller.

12. A system according to claim 1, wherein the user interface is configured to receive a request from the mortgage seller to apply the capital standards.

13. A system according to claim 1, wherein the user interface is configured to receive a request from the mortgage purchaser to apply the capital standards.

14. A system according to claim 1, wherein the delegated underwriting and servicing agreement includes a provision requiring the mortgage seller to determine compliance on a monthly basis.

15. A system according to claim 1, wherein the mortgage data and financial data are received from the mortgage seller on a periodic basis.

16. A system according to claim 1, wherein the delegated underwriting and servicing agreement includes a provision requiring the mortgage purchaser to determine compliance on a quarterly basis.

17. A system according to claim 1, wherein the delegated underwriting and servicing agreement includes provisions for remedies and processes for the mortgage purchaser if the mortgage seller is not in compliance.

18. A computer system configured to determine compliance with a delegated underwriting and servicing agreement between a mortgage seller and a mortgage purchaser relating to the sale of multifamily mortgage loans using a computer network, the delegated underwriting and servicing agreement including a loss sharing provision, a servicing provision allowing the mortgage seller to retain servicing rights for the multifamily mortgage loans and a provision that the mortgage seller be adequately capitalized against risk for each multifamily mortgage loan, the method system comprising:

machine readable media having programmed instructions stored therein, wherein the programmed instructions implement data capture logic and compliance logic;

a processor coupled to the machine readable media and operable to execute the programmed instructions, wherein the programmed instructions implement method steps comprising         receiving, by the data capture logic, mortgage data regarding at least one multifamily mortgage loan in a mortgage portfolio of the mortgage seller associated with the delegated underwriting and servicing agreement and financial data regarding the mortgage portfolio;

receiving, by the data capture logic, mortgage seller data regarding the mortgage seller;

storing the mortgage data, financial data and mortgage seller data in at least one database;

applying, by the compliance logic coupled to the at least one database and implemented by the instructions, a set of predefined capital standards to the mortgage data, financial data and mortgage seller data to determine compliance of the mortgage seller on an ongoing basis with the delegated underwriting and servicing agreement during the term of the delegated underwriting and servicing agreement, the set of predefined capital standards including at least 1) a business activity requirement regarding appropriate business activities of the mortgage seller, 2) a net worth requirement including a minimum net worth for the mortgage seller and a valuation of the servicing rights, 3) a risk-based liquidity requirement determined based on risk characteristics for each of the multifamily loans in the mortgage portfolio and used to determine if the mortgage seller can meet obligations of the loss sharing provision and 4) a servicing rights requirement regarding the encumbrance of the servicing rights; and     generating a compliance determination based on the application of the predefined capital standards.

19. A system according to claim 18, wherein the appropriate business activities of the mortgage seller includes non-recourse business activities.

20. A system according to claim 18, wherein the appropriate business activities of the mortgage seller includes business activities approved by the mortgage purchaser.

21. A system according to claim 18, wherein the risk-based liquidity requirement includes a requirement to maintain a plurality of liquidity accounts.

22. A system according to claim 21, wherein the plurality of liquidity accounts include an operational liquidity account, a restricted liquidity account and an unrestricted liquidity account.

23. A system according to claim 21, wherein the risk-based liquidity requirement includes a predetermined amount of capital for each of the plurality of liquidity accounts.

24. A system according to claim 23, wherein the plurality of liquidity accounts are fully funded in a predetermined time period.

25. A system according to claim 23, wherein the mortgage seller data includes a credit rating for the mortgage seller and the predetermined amount of capital for each liquidity account is adjusted when the credit rating is a predetermined credit rating.

26. A system according to claim 23, wherein the mortgage seller data includes a credit rating for a parent company of the mortgage seller and the predetermined amount of capital for each liquidity account is adjusted when the credit rating is a predetermined credit rating.

27. A system according to claim 18, wherein the risk-based liquidity requirement includes a separate liquidity requirement for each of the multifamily loans in the mortgage portfolio that is determined based on risk characteristics of the respective loan, the risk characteristics including a debt service coverage ratio and loan-to-value ratio of the respective loan.

28. A system according to claim 18, wherein the risk-based liquidity requirement includes a measurement of mark-to-market portfolio risks and multifamily loan concentration risks.

29. A system according to claim 18, wherein the mortgage seller data includes financial data related to the mortgage seller.

30. A system according to claim 18, wherein the delegated underwriting and servicing agreement includes a provision requiring the mortgage seller to determine compliance on a periodic basis.

31. A system according to claim 18, wherein the mortgage data and financial data are received from the mortgage seller on a periodic basis.

\* \* \* \* \*